(12) United States Patent
Tian

(10) Patent No.: US 12,552,525 B2
(45) Date of Patent: Feb. 17, 2026

(54) AIRCRAFT SUPPORT ARM

(71) Applicant: Autoflight (Kunshan) Co., Ltd., Kunshan (CN)

(72) Inventor: Yu Tian, Hong Kong SAR (CN)

(73) Assignee: Autoflight (Kunshan) Co., Ltd., Jiangsu Province (CN)

( * ) Notice: Subject to any disclaimer, the term of this patent is extended or adjusted under 35 U.S.C. 154(b) by 0 days.

(21) Appl. No.: 18/509,273

(22) Filed: Nov. 14, 2023

(65) Prior Publication Data

US 2024/0308652 A1   Sep. 19, 2024

Related U.S. Application Data

(60) Provisional application No. 63/383,522, filed on Nov. 14, 2022.

(30) Foreign Application Priority Data

Sep. 19, 2023   (CN) .......................... 202311204664.5

(51) Int. Cl.
*B64C 27/48* (2006.01)
*B64U 10/16* (2023.01)
*B64U 20/00* (2023.01)

(52) U.S. Cl.
CPC .............. *B64C 27/48* (2013.01); *B64U 10/16* (2023.01); *B64U 20/00* (2023.01)

(58) Field of Classification Search
CPC ........ B64U 10/16; B64U 10/25; B64U 20/00; B64U 50/19; B64C 27/08; B64C 27/20; B64C 27/26; B64C 11/46; B64D 27/30
See application file for complete search history.

(56) References Cited

U.S. PATENT DOCUMENTS

| | | | | |
|---|---|---|---|---|
| 2019/0031361 A1* | 1/2019 | McCullough | .......... | B64U 50/13 |
| 2020/0307814 A1* | 10/2020 | Peng | .............. | B64D 27/40 |
| 2023/0227185 A1* | 7/2023 | Nysæter | .............. | B64U 20/83 |
| | | | | 244/119 |
| 2023/0406487 A1* | 12/2023 | Butterfield | .......... | B64C 29/0033 |

FOREIGN PATENT DOCUMENTS

DE   10212467 A1 * 10/2003   ............. F01D 5/141

OTHER PUBLICATIONS

DE10212467 translation, retrieved from USPTO search Feb. 14, 2025.*

* cited by examiner

*Primary Examiner* — Courtney D Heinle
*Assistant Examiner* — Cameron A Corday
(74) *Attorney, Agent, or Firm* — WPAT LAW, P.C.; Anthony King

(57) ABSTRACT

An aircraft and its associated aircraft linear support arms. The aircraft linear support arms include at least a rotor motor and a propeller. The rotor motor is connected to the propeller, and the linear support arm has a cross-sectional shape of an inverted teardrop shape. The streamlined structure of the inverted teardrop-shaped arm can reduce eddy currents formed by the propeller's downwash flow due to interference caused by the aircraft body, thereby reducing the wear and tear of the lift motor and increasing the efficiency of the lift motor.

13 Claims, 3 Drawing Sheets

AIRCRAFT SUPPORT ARM

FIELD OF THE DISCLOSURE

The present disclosure relates to an aircraft and, more particularly, an aircraft and a support arm.

BACKGROUND OF THE INVENTION

Generally, an eVTOL (electric vertical takeoff and landing) aircraft is an aircraft having vertical lift motors and propellers.

There is a continuing need for new structural designs to improve the efficiency of these lift motors.

All referenced patents, applications and literatures are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply. The disclosed embodiments may seek to satisfy one or more of the above-mentioned needs. Although the present embodiments may obviate one or more of the above-mentioned needs, it should be understood that some aspects of the embodiments might not necessarily obviate them.

SUMMARY OF THE INVENTION

The purpose of this disclosure is to provide an aircraft and an aircraft support arm. The streamlined structure of the support arm's cross section can include an inverted teardrop shape which can or cannot reduce the eddy currents formed by the propeller's downwash to the support arm housing. By reducing the eddy currents, the wear and tear on the lift motor can be reduced. Additionally, or alternatively, by reducing the eddy currents, lift motor efficiency can improve.

In order to solve the above technical problems, the present disclosure provides an aircraft arm, including: a rotor motor and a propeller; the rotor motor is connected to the propeller; an arm housing, the rotor motor is at least partially disposed in the arm housing (i.e., the arm body). In one embodiment, a portion of the rotor motor (i.e., lift motor) extends outside the arm body and can be connected to the propeller. At least part of the arm housing can have an inverted drop-shaped cross-sectional shape.

This disclosure also provides an aircraft having the above-mentioned aircraft support arm.

Optionally, the ratio of the height of the inverted water drop shape to its width is including and between 1.5 to 2.

Optionally, the support arm housing includes an arm opening that communicates with the inside of the arm body, and the rotor motor passes through the arm opening and is seated inside the arm housing.

Optionally, an outwardly expanding bowl mouth structure is provided at the port of the machine arm opening. The bowl mouth structure can have an inverted frustro-conical shape.

Optionally, the deviation angle between the plane where the edge of the arm opening is located, and the transverse plane of the aircraft arm is including and between 3-10 degrees.

Optionally, the plane of the edge of the arm opening is higher than the arm housing on both sides of the arm opening.

Optionally, at least the cross-sectional shape of the arm body on both sides of the arm opening is an inverted teardrop shape.

Optionally, the ratio of the height of the cross section of the arm on both sides of the arm opening to its width is 1.65.

Optionally, the arm body is made of carbon fiber material.

The streamlined structure of the inverted drop-shaped arm section of the application can reduce the eddy currents formed by the propeller downwash flow due to interference by the support arm housing, thereby reducing the wear and tear of the lift motor and increasing the efficiency of the lift motor.

Certain features that are described in this specification in the context of separate implementations can also be implemented in combination in a single implementation. Conversely, various features that are described in the context of a single implementation can also be implemented in multiple implementations separately or in any suitable subcombination.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

DETAILED DESCRIPTION

Figure 1:
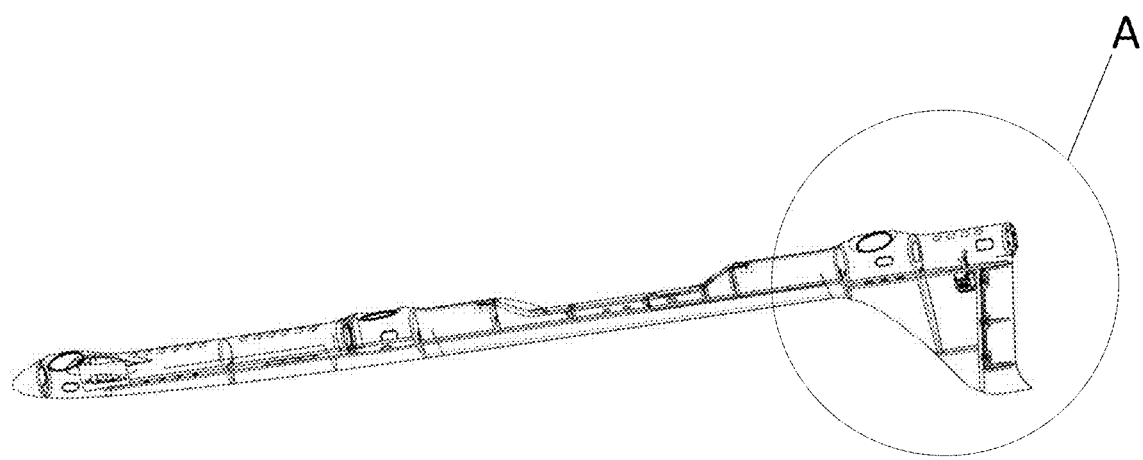
FIG. 1 shows a schematic structural diagram of an aircraft support arm according to one embodiment of the present application.

The following embodiments further illustrate the technical solution of the present application. It is to be understood that the specific embodiments described herein are merely for explanation of the present application. It should also be noted that, for convenience of description, only some but not all parts relevant to the present application are shown in the drawings.

It should be noted that, unless otherwise clearly stated and limited, the terms "installation", "connection" and "connected" should be understood in a broad sense. For example, it can be a fixed connection or a detachable connection. It can be a mechanical connection or an electrical connection; it can be a direct connection or an indirect connection through an intermediate medium; it can be an internal connection between two components. For those of ordinary skill in the art, the specific meanings of the above terms in this application can be understood on a case-by-case basis.

In this application, unless otherwise explicitly stated and limited, the term "above" or "below" a first feature to a second feature may include direct contact between the first and second features or may also include the first and second features. Not in direct contact but through additional characteristic contact between them. Furthermore, the terms "above", and "on top of" a first feature on a second feature include the first feature being directly above and diagonally above the second feature, or simply mean that the first feature is higher in level than the second feature. "Below", and "under" the first feature is the second feature includes the first feature being directly below and diagonally below the second feature, or simply means that the first feature is less horizontally than the second feature.

Figure 2:
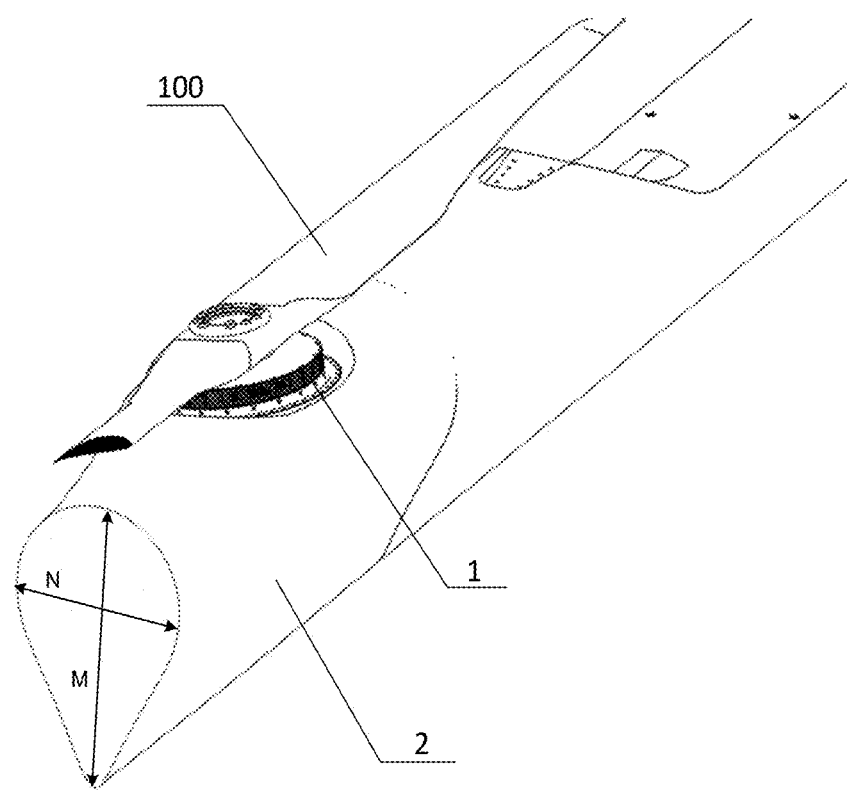
FIG. 2 shows a schematic cross-sectional structural diagram of an aircraft support arm according to one embodiment of the present application.

The following describes embodiments of the present application with reference to the accompanying drawings. As shown in FIGS. 1 and 2, the aircraft arm of the embodiment of the present application includes: a rotor motor 1 and an arm housing 2. The rotor motor 1 is connected to a propeller 100; the rotor motor 1 can be arranged inside the arm housing 2 and can partially extend out of the housing body 2. The rotor motor 1 is connected to the propeller 100, and at least part of the arm housing 2 has an inverted teardrop-shaped cross-sectional shape.

In one embodiment, at least a section directly underneath a rotational area of the propeller 100 has the inverted teardrop shape.

In another embodiment, the teardrop shape is disposed along a substantial length of the support arm. In yet another embodiment, the teardrop shape is disposed along at least 80% of the entire length of the support arm. In still another embodiment, the teardrop shape is disposed along at least 50% of the entire length of the support arm.

Figure 3:
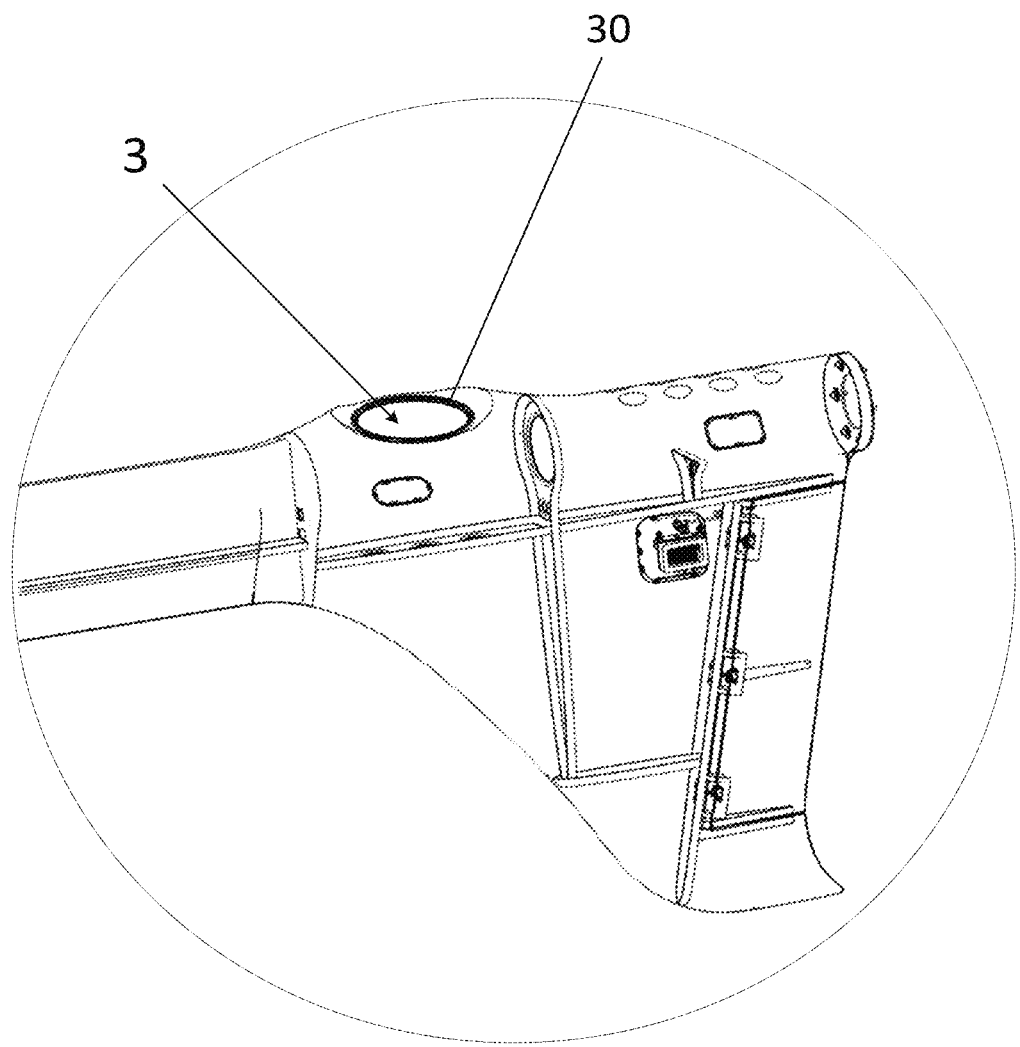
FIG. 3 shows an enlarged partial view of A in FIG. 1.

Specifically, as shown in FIG. 3, the aircraft arm includes an arm opening 3, which is internally connected to the arm body 2. The rotor motor 1 passes through the arm opening 3 and is seated inside the arm body 2. The arm body 2 is preferably made of carbon fiber material, which is beneficial to the lightweight design of the aircraft. As shown in FIG. 2, the cross-section of the machine arm body 2 presents an inverted teardrop-shaped structure that gradually shrinks from top to bottom. The water drop-shaped structure includes a height M and a width N. The ratio of M and N is designed to be 1.5 to 2. After testing, this ratio of the teardrop-shaped structure underneath the propeller can effectively reduce the eddy currents formed when the propeller downwash is interfered by the arm housing, thereby reducing the wear and tear of the rotor motor and increasing the efficiency of the rotor motor. Preferably, the ratio of the arm sections M and N on both sides of the arm opening 3 is 1.65. The downwash flow on both sides of the arm opening 3 is the largest. Setting the ratio of M to N to 1.65 can minimize the formation of vortices in the propeller downwash flow caused by interference from the arm housing.

In other embodiments, the teardrop shape can be replaced by an almond shape having a pointy top and a pointy bottom.

Figure 4:
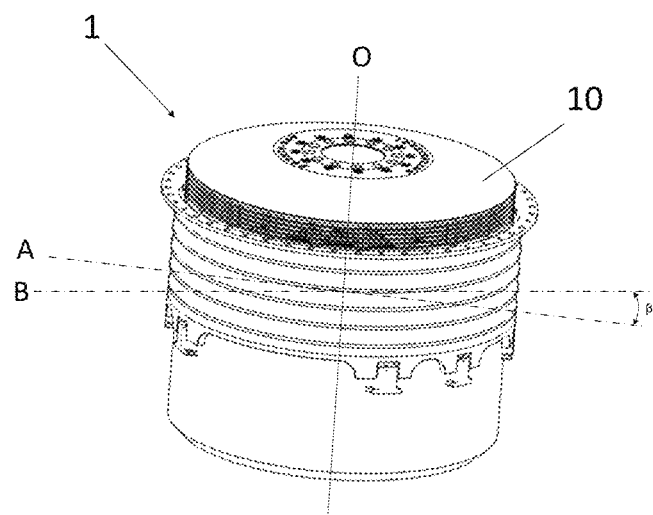
FIG. 4 shows a schematic structural diagram of a rotor motor (i.e., lift motor) according to an embodiment of the present application.

Further, as shown in FIGS. 3 and 4, the port of the arm opening 3 is provided with an outwardly expanding bowl mouth structure. In this embodiment, the rotor motor 1 can be partially disposed inside the arm housing 2. The rotor motor 1 can have an internal centrifugal fan 10 hidden under a cover, where the cover has side vents thereby allowing the centrifugal fan 10 to ventilate the rotor motor 1. The fan 10 is disposed within the bowl structure of the machine arm opening 5 and yet it is exposed outside the arm housing. By such design, the fan 10 is not exposed to the windward airflow on the surface of the arm housing 2, thereby ensuring the streamlined, aerodynamic shape of the arm housing 2 without creating resistance. At the same time, the centrifugal fan 10 is exposed to the exterior of the arm housing, thereby facilitate better ventilation.

Further, as shown in FIGS. 3 and 4, the plane where the edge 30 of the arm opening 3 is located is parallel to the first plane A, and the transverse plane of the aircraft arm is parallel to the second plane B (that is, the horizontal plane where the aircraft arm is located), the deviation angle α between the first plane A and the second plane B is 3-10 degrees. Multiple rotor motors of an aircraft can have deviation angles and the rotor motors can be of different sizes from each other. By such arrangements, these different deviation angles of each rotor motor can facilitate flight control of the aircraft.

Further, as shown in FIG. 3, the plane where the edge portion 30 of the arm opening 3 is located is higher than the arm body 2 on both sides of the arm opening 3. The edge portion 30 is raised to a certain extent, so that the motor 1 and the propeller 100 are raised correspondingly, thereby preventing the propeller 100 from interfering with the aircraft arm due to the inevitable up and down amplitude during rotation.

The streamlined structure of the inverted drop-shaped arm section of the application can reduce the eddy currents formed by the propeller downwash flow due to interference by the aircraft body, thereby reducing the loss of the lift motor and increasing the efficiency of the lift motor.

Figure 5:
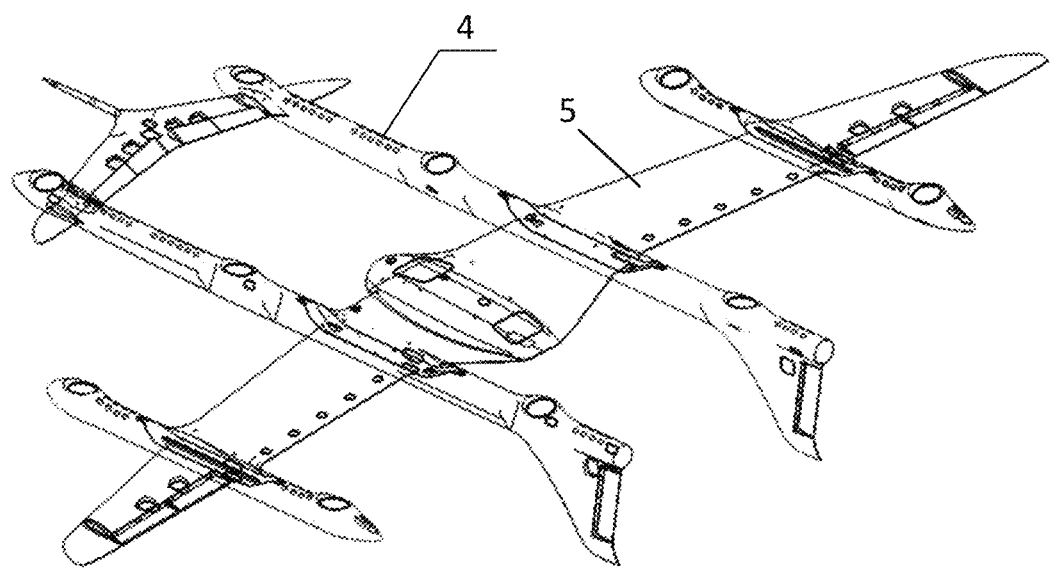
FIG. 5 shows a schematic structural diagram of an aircraft according to an embodiment of the present application.

This application also provides an aircraft, as shown in FIG. 5, including the above-mentioned aircraft arm 4 and a wing 5. The streamlined structure of the support arm cross-section of this application can reduce the eddy currents formed by the propeller downwash flow in interference with the arm housing and/or the wing 5, thereby reducing the wear and tear of the rotor motor and increasing the efficiency of the rotor motor.

Thus, specific embodiments and applications of an aircraft support arm have been disclosed. It should be apparent, however, to those skilled in the art that many more modifications besides those already described are possible without departing from the disclosed concepts herein. The disclosed embodiments, therefore, is not to be restricted except in the spirit of the appended claims. Moreover, in interpreting both the specification and the claims, all terms should be interpreted in the broadest possible manner consistent with the context. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the embodiments.

What is claimed is:

1. A support arm for an aircraft, said support arm comprising:
   an elongated support arm housing (2) having a length;
   a first lift motor (1) at least partially disposed within said support arm housing (2);
   a second lift motor at least partially disposed within said support arm housing;
   a first propeller (100) connected to said first lift motor;

a second propeller connected to said second lift motor;
wherein a section of the support arm housing (2) has a cross-sectional shape of an inverted teardrop; and
wherein said section includes an entire length of the elongated support arm housing spanning from said first lift motor to said second lift motor.

2. The support arm as recited in claim 1, wherein said inverted teardrop has a height and a width, and wherein the ratio of the height vs. the width is between 1.5 and 2.0.

3. The support arm as recited in claim 1, further comprising an opening (3) disposed on the support arm housing (2) connecting an interior of the support arm housing (2) to an ambient environment; said lift motor (1) is disposed in close proximity to the opening (3).

4. The support arm as recited in claim 3, where the opening (3) includes an inverted frusto-conical shape rim.

5. The support arm as recited in claim 3, wherein said inverted teardrop has a height and a width, and wherein the ratio of the height vs. the width is 1.65.

6. The support arm as recited in claim 1, wherein the support arm housing (2) includes a carbon fiber material.

7. A linear support arm for an aircraft comprising:
a hollow interior;
a first opening disposed on the linear support to receive therein a first lift motor;
a second opening disposed on the linear support to receive therein a second lift motor;
a first propeller attached to said first lift motor;
a second propeller attached to said second lift motor;
an inverted teardrop cross-sectional shape along a length of the linear support arm spanning from and including the first opening to and including said second opening.

8. The linear support arm as recited in claim 7, wherein the liner support arm is connected to a main wing of the aircraft.

9. The linear support arm as recited in claim 8, further comprising a vertical stabilizer coupled to a terminal end of the linear support arm.

10. The linear support arm as recited in claim 8, further comprising a third opening disposed on the linear support between said first opening and said second opening; and said third opening received therein a third lift motor to which a third propeller is attached.

11. The linear support arm as recited in claim 7, wherein said inverted teardrop cross-section shape has a pointy bottom.

12. The linear support arm as recited in claim 7, further comprising a canard wing connected thereto.

13. The linear support arm as recited in claim 7, wherein the entire linear support arm is straight.

* * * * *